May 10, 1960 F. H. PASSALAQUA 2,936,093
QUICK OPENING TANK
Filed April 13, 1955 6 Sheets-Sheet 2

Inventor:
Frank H. Passalaqua,
By Merriam & Lorch,
Attys.

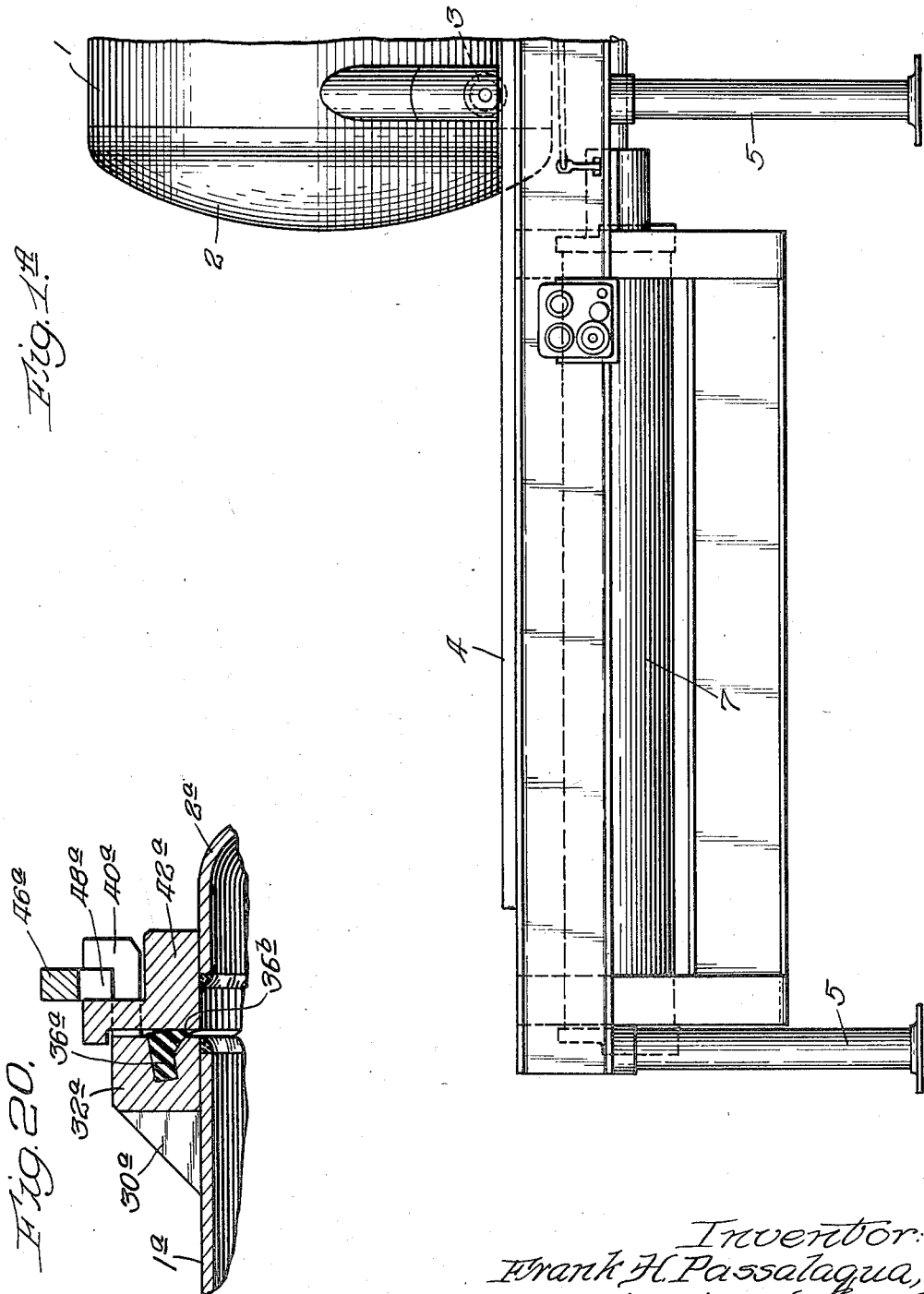

May 10, 1960    F. H. PASSALAQUA    2,936,093
QUICK OPENING TANK
Filed April 13, 1955    6 Sheets-Sheet 4
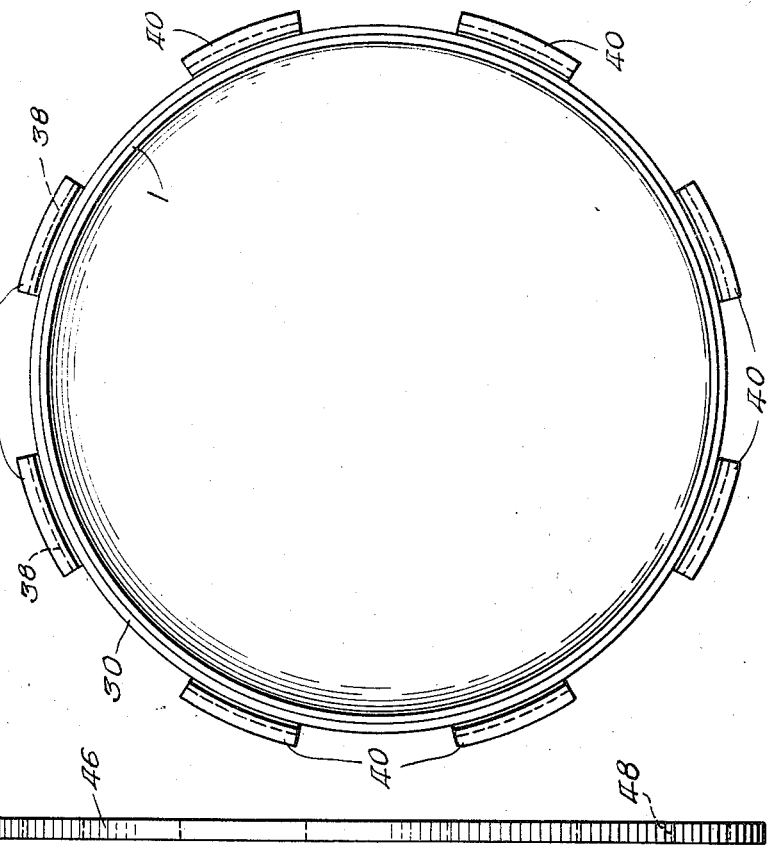
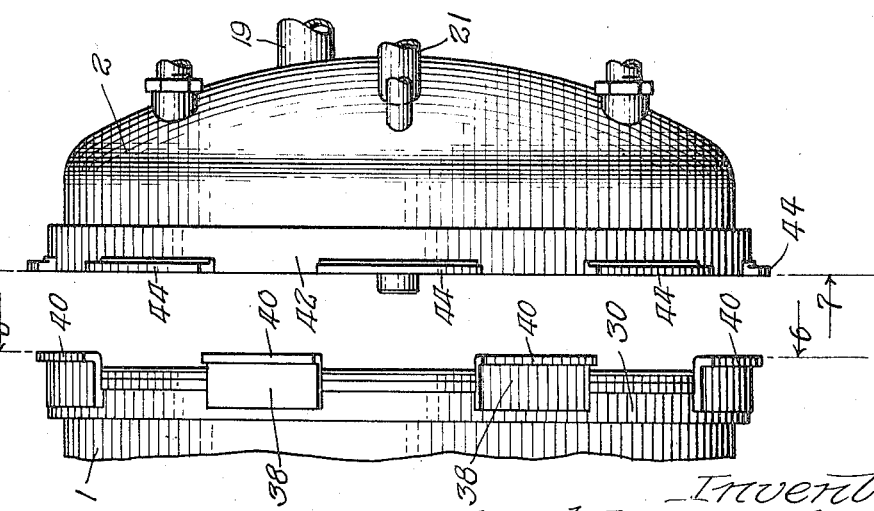

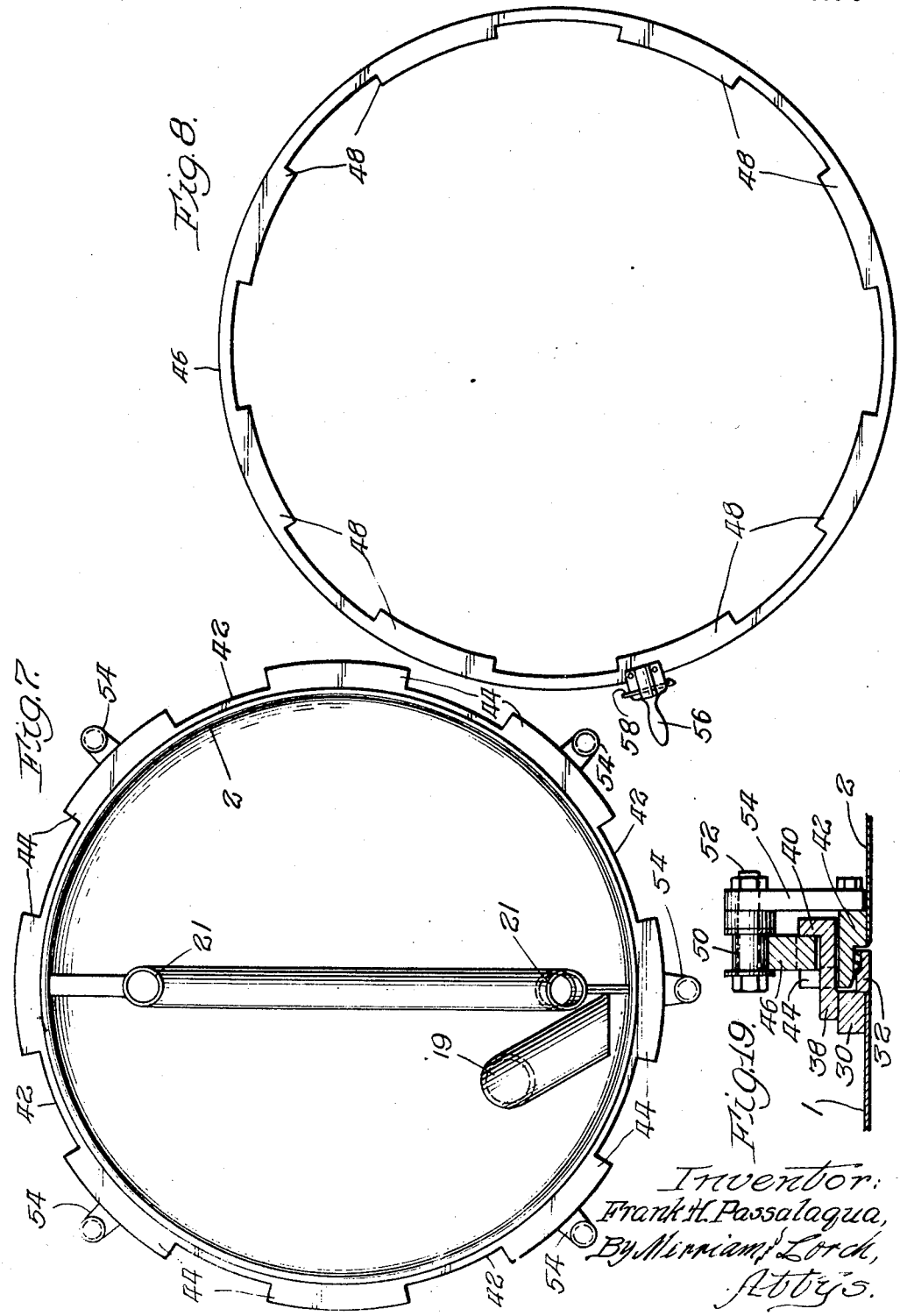

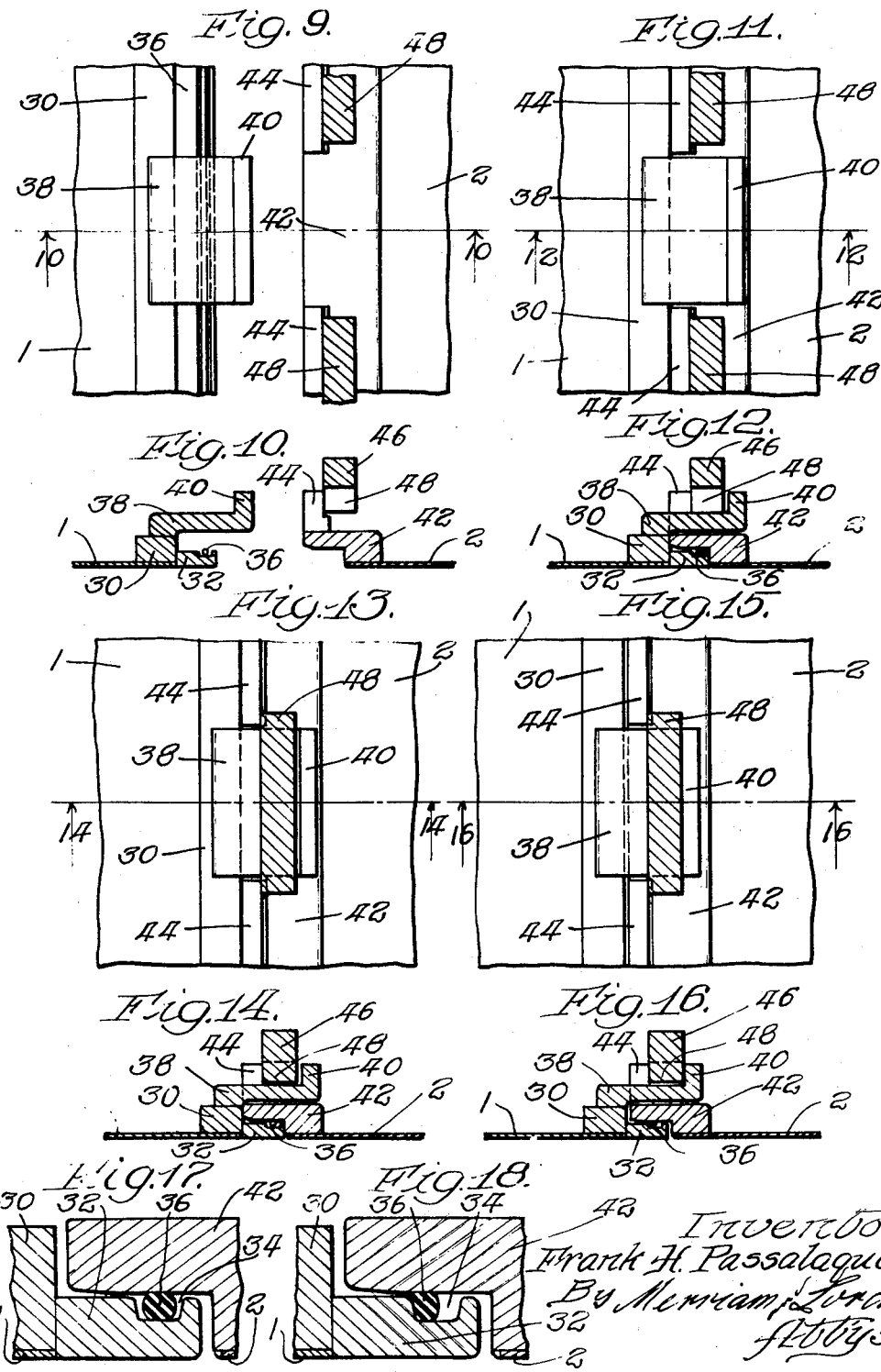

United States Patent Office 2,936,093
Patented May 10, 1960

2,936,093

QUICK OPENING TANK

Frank Henry Passalaqua, McHenry, Ill., assignor to Sparkler Mfg. Co., a corporation of Illinois Application April 13, 1955, Serial No. 501,108

2 Claims. (Cl. 220—40)

This invention relates to a quick opening tank cover for use on any tank in which a simple, fluid-tight, readily breakable seal is required.

The invention is particularly useful on tanks in which fluids are placed under pressure for processing, storage or transportation. However, it is also equally usable on tanks in which it is desired to maintain a partially evacuated condition.

One specific example of use to which this invention may be used is a cover for a tank in which liquids are filtered under pressure. The use of this invention in such a tank permits rapid opening and closing of the tank cover for inspection and cleansing of the tank or for changing of filter units as may be necessary.

In many instances, tank covers used on filters have employed a number of bolts or other clamping devices spaced about the outer periphery of the cover and tank, which devices required separate, that is, individual, manual tightening. In other instances, attempts have been made to employ a unitary means for simultaneously operating a series of locking devices. In the instance of the first-mentioned devices, much time was required to tighten all of them and skill was required in applying equal effects on the various devices. In the second instance, the unitary controls have generally embodied complex and costly mechanisms making their sale and use limited, if not prohibitive.

The present invention overcomes the disadvantages of prior devices and provides a tank cover that may be quickly locked in closed position with the application of a minimum of force by the operator, provides a pressure-tight seal and permits ready reopening of the tank at any desired time after pressure has been released in the tank, with the application of a minimum of force by the operator. Furthermore, when the cover of this invention is closed, a fluid-tight seal is immediately formed and thereafter any pressure from within the tank operates only to make the closure more secure.

The foregoing is accomplished in general by a plurality of spaced locking lugs on the tank cooperating with a second series of spaced locking lugs on the cover, one set of lugs passing between the lugs of the other set and an annular locking ring with cooperating spaced lugs of sufficiently arcuate length to span the space between the fixed lugs and prevent passage of the movable lugs therebetween when the ring is rotated to one position and to permit passage of the movable lugs when rotated to another position.

A more complete understanding of this invention will be obtained from the following description when considered in connection with the drawings, in which:

Figure 1a is a similar view, i.e., a continuation of Figure 1 showing the left portion of the tank and the tank moving mechanism;

Figure 2 is an end elevation taken along line 2—2 of Figure 1 of the quick opening cover end of the tank shown in Figures 1 and 1a;

Figure 3 is a top plan elevation of the open end of the tank;

Figure 4 is a similar view of the cover;

Figure 5 is a similar view of the locking ring;

Figure 6 is an end elevation of the open end of the tank taken along line 6—6 of Figure 3;

Figure 7 is an end elevation of the end of the cover taken along line 7—7 of Figure 4;

Figure 8 is an end elevation of the locking ring;

Figure 9 is a fragmentary detail, partly in section, of the open end of the tank (left) and the cover (right) and locking ring (in section) in open position;

Figure 10 is a fragmentary sectional view taken along line 10—10 of Figure 9;

Figure 11 is a fragmentary detail, partly in section, of the tank and cover moved to closed position but not locked;

Figure 12 is a fragmentary sectional view taken along line 12—12 of Figure 11;

Figure 13 is a view, similar to Figure 11, with the locking ring in locked position and the tank body urged to locking position by the tank body moving cylinder;

Figure 14 is a fragmentary sectional view taken along line 14—14 of Figure 13;

Figure 15 is a view similar to Figure 13 except that the power moving means for the tank has been released and the tank has settled into locked position;

Figure 16 is a fragmentary section taken along line 16—16 of Figure 15;

Figure 17 is an enlarged fragmentary detail, in section, illustrating the condition of the sealing ring or gasket before pressure is applied within the tank;

Figure 18 is a similar view showing the condition of the sealing ring or gasket with pressure in the tank; and Figure 19 is a fragmentary detail illustrating one of the rotating supports for the locking ring.

Figure 20 is an enlarged fragmentary detailed end section illustrating the use of a modified L-shaped sealing ring.

Figure 2:
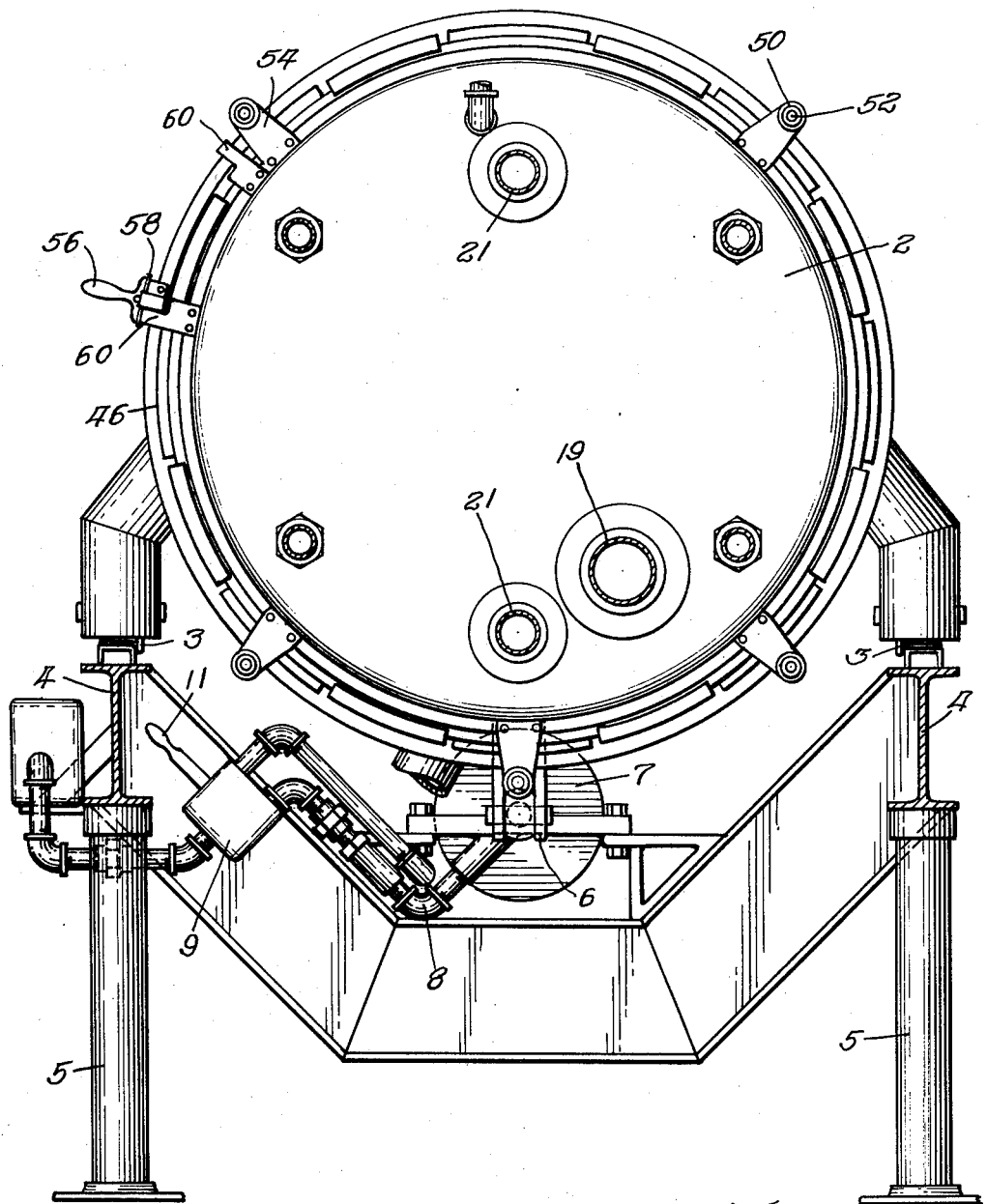

As shown in the drawings, the invention is applied to a pressure filter tank having a movable body 1 having one end closed and the other open and a stationary cover 2 for the latter end. The body is movable horizontally on rollers 3 traveling on supporting rails 4 supported on legs 5. Any suitable power operated means may be utilized to move the body toward and from the cover along the rails such as a hydraulic cylinder 6 connected to the body through linkage 7 (Figure 2). Cylinder 6 may be supplied with fluid under pressure through connections 8 which include a valve mechanism 9 under control of the manually operable lever 11. Obviously any other power drive such as an electric motor or even a manually operable hand wheel with a gear and rack driving connections may be used in place of the hydraulic means.

Figure 1:
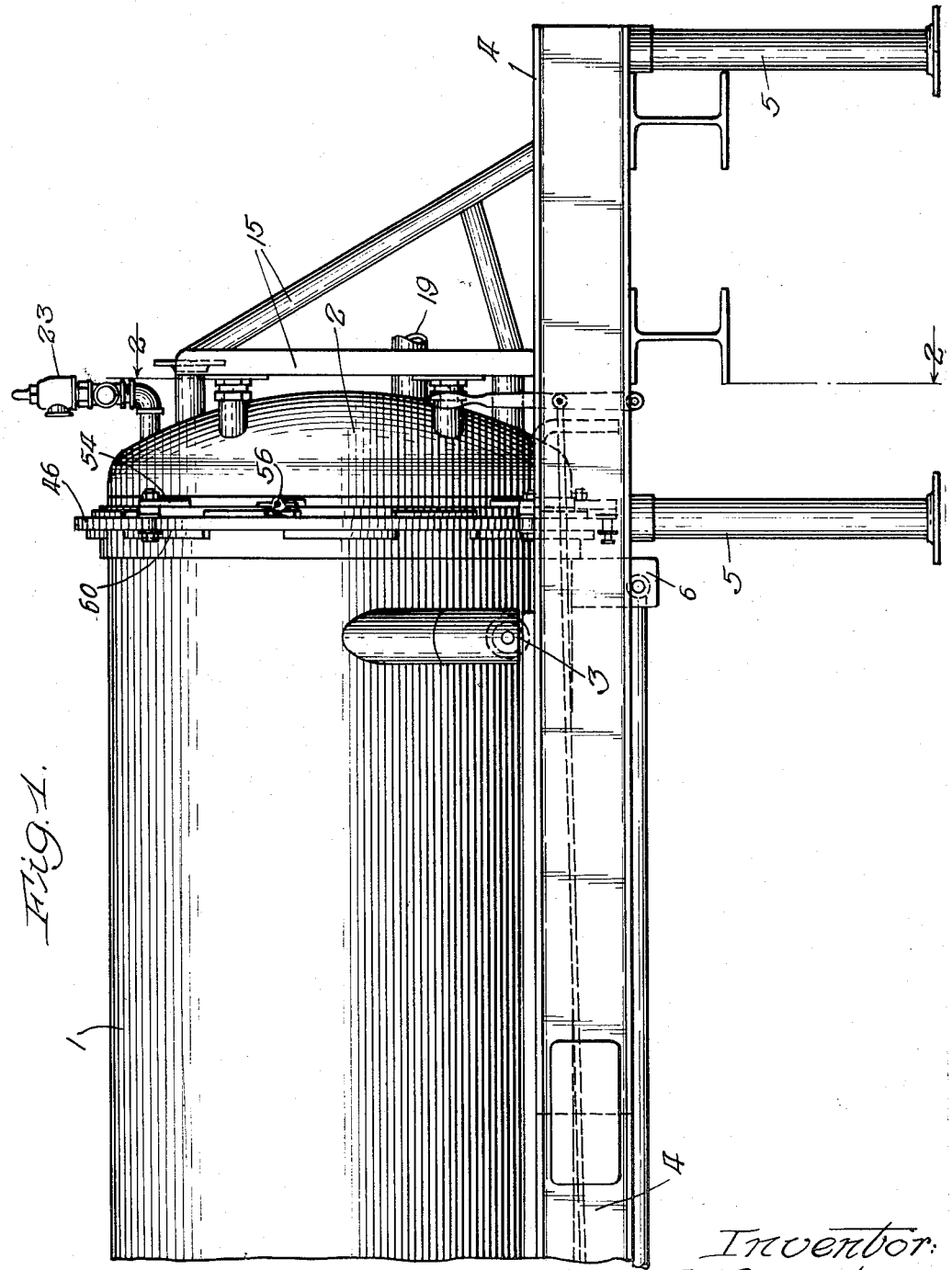
Figure 1 is a side elevation of the right or cover end portion of a quick opening tank embodying the principles of this invention.

Cover 2 is also supported from the rails 4 by an A frame 15 (Figure 1). The cover has the necessary inlet connections 19, outlet connections 21, blow-off valve 23 and other connections customary in this type of filter. The cover also serves as the support for the filter media (not shown) such as plates, or any other desirable means, in such manner that the tank body may be completely removed from the filtering media by rolling the tank along the rails to a position where the plates can be cleaned, repaired and/or replaced without disturbing the various connections to the cover.

In order to provide a pressure-tight seal between the tank and cover, each are provided with cooperating, readily-operable locking means. The open end of the body is provided with a tank extension assembly comprising, a reinforcing ring 30, rectangular in cross section, preferably welded to the outer perimeter of the open end of the tank body, a tank sealing ring 32 which abuts the end of the tank forming in effect a continuation thereof and is welded to ring 30 and also to the end of the tank body. The sealing ring is provided with an annular groove 34 in its outer surface for receiving a solid O ring or resilient gasket 36. In some instances it may be desirable to utilize a center core in the O ring gasket to prevent sagging. Such a core may be a metallic coiled spring, synthetic fiber cord or a natural fiber cord or combinations of these. Welded to the outer annular surface of ring 30 are spaced arcuate lugs 38 equal in peripheral or arcuate length and having outturned flanges 40 which may be integral therewith or sections welded thereto. Obviously the lugs may be integral with the ring, i.e., milled therefrom and preferably there are eight such lugs for the size tank illustrated, spaced equally around the perimeter of the reinforcing ring 30, each lug comprising 19° 30′ of arc and being spaced 25° 30′ from each other. Obviously other spacing and width of lugs may be employed. However, the foregoing has been found satisfactory.

The cover 2 is likewise provided with an extension assembly which comprises, an annular sealing ring 42 preferably welded to the open end of the cover and in effect forming an extension thereof in the direction of the body of the tank. The ring is L-shaped in cross section and of such dimension that its outer extending end portion surrounds the tank sealing ring 32 with slight clearance. The clearance between the overlapping portions of ring 32 and ring 42 and the depth of groove 34 is such that the O ring gasket will be confined and under pressure, i.e., slightly compressed as the tank is closed. This is of particular importance when such fluids as hot oils are under pressure in the tank. Also secured to the cover sealing ring 42, preferably by welding, is a series of equally spaced locking lugs 44 equal in number to the spaces between lugs 40 and designed to be passable therebetween. Therefore, they occupy approximately 25 degrees of arc and are spaced approximately 20 degrees apart so as to enable the locking lugs 44 on the cover to slide between and beyond the locking lugs 40 on the tank when the cover is moved into closed position leaving a substantial space between the opposing faces of lugs 40 and lugs 44.

The cover is locked in closed position by an annular locking ring 46 having inwardly projecting equally spaced lugs 48. Each inwardly projecting lug 48 extends to, i.e., occupies an arc of 22° 30′ and is spaced 22° 30′ from the next adjacent lug. The locking ring is of a thickness substantially equal to that of the space between lugs 44 and 40 when the cover is in closed position. It will be observed from the foregoing that the inwardly projecting lugs of the locking ring are of sufficient peripheral (arcuate) length, i.e., 22° 30′, to extend over a sufficient arc to more than span the distance between lugs 44. Thus when the ring is in locking position it will prevent passage of lugs 40 of the tank body through the openings between lugs 44 of the cover and thus retain the tank body in closed position.

As shown in Figure 4 the locking ring 46 is carried by the cover 2 and is mounted for rotation thereon by means of five roller assemblies 50. The rollers 50 are rotatably mounted on studs 52 (Figure 19), threadedly secured to the outer ends of arms 54, which are in turn secured to ring 42. Five such assemblies, engaging the outer periphery of the ring, are employed as is illustrated more fully in Figures 2 and 7. This support permits ready rotation of the locking ring through the arc necessary to present its lugs 48 in either locking or unlocking position.

To facilitate rotation of the ring a handle 56 is secured to the ring 46 and projects radially outwardly therefrom in a position where it may be readily grasped by the operator. The handle is provided with a spring-pressed latch bar 58 terminating at a hook at each end, which bar engages the shoulders of either one or the other of two keepers 60 (Figure 2) also bolted to the cover sealing ring 42 and projecting radially outward in position to be engaged by the latch bar 58. The keepers 60 are spaced apart, a sufficient distance to permit rotation of the locking ring 46 from open to locked position and with the latch bar 58 securing the handle in either locked or unlocked position by engagement with the upper or lower keeper 60.

The progressive steps or stages in operation of the quick opening tank cover are best illustrated in Figures 9 through 18. In Figures 9 and 10 the cover is shown in unlocked and open position, that is, the tank body is shown separate from the cover with the locking ring rotated to its unlocked position where its lugs 48 lie alongside the lugs 44 of the cover.

In Figures 11 and 12 the body has been moved into closed position against the cover, that is, to its furtherest closed position, providing maximum distance (in closed position) between lugs 40 and 44, so that ring 46 may be freely rotated. In moving the tank body to closed position it is moved slightly beyond its normally closed position to permit easy rotation of the locking ring. In this closing movement the gasket 36 is engaged by and slightly compressed between, the inner surface of the cover sealing ring and the bottom of the groove in the tank sealing ring. In Figures 11 and 12 the locking ring is still in unlocked position, that is, its lugs 48 still lie along side of lugs 44.

In Figures 13 and 14 the body and cover are in the same positions shown in Figures 11 and 12 but the locking ring has been rotated to locked position so that its locking lugs 48 span, i.e., extend slightly beyond, the spaces between lugs 44 on the cover sealing ring, and thus prevent lugs 40 on the tank sealing ring from moving to the left and passing between lugs 44 as they would have to do if the tank body were moved to the left to open position.

After the locking ring has been moved to locking position the tank body moving means is released, that is, pressure is released in the hydraulic cylinder and upon pressure being applied in the tank by the fluid to be filtered the body will move slightly to the left as shown in Figures 15 and 16 due to the internal pressure tending to open the tank. This places sufficient frictional resistance on the locking ring so that it cannot be rotated to open position. The condition of the tank and cover after pressure is first applied within the tank is shown more clearly in Figure 17 and the effect of increased pressure within the tank on the sealing ring or gasket is illustrated in Figure 18. From this latter figure it can be seen that internal pressure within the tank tends to deform the O ring gasket and make the seal between the cover and the tank body more effective.

In Figure 20 there is shown a modified form of the invention in which the corresponding parts are given the same reference characters with a suffix "a" and in which a slightly different type of gasket is used, the other elements are substantially the same, but instead of an O ring a flanged or L-shaped gasket 36a is employed which instead of having sliding contact with the locking ring on the cover engages the end face of the cover ring and has a slightly projecting lip 36b.

When this type of gasket is employed it is preferable to have either the locking lugs on the tank ring or the locking lugs on the cover ring adjustable in a horizontal direction in order to compensate for any possible variation in gasket thickness either as initially supplied or resulting from use. As in the case of the O ring gasket, internal pressure within the latter tends to urge the gasket into tighter sealing engagement and thus tends to improve the pressure tight seal.

From the foregoing description it will be apparent that there has been provided a quick opening tank cover and locking means therefor that is both economical to manufacture and easily operated. A simple partial rotation of the locking ring either positively locks the cover and tank together or unlocks it so that the tank may be moved to open position. Obviously the locking ring may be carried by either the tank body or the cover and the cover rather than the tank may be movable if such construction were desirable.

It will be apparent to those skilled in the art that many other changes may be made in the details of construction without departing from the spirit and scope of the invention as defined in the claims.

We claim:

1. In a pressure tight quick locking and opening tank having a fixed tank body having one open end and a non-rotatable cover for the open end of said tank, said tank body and cover being movable with respect to each other to open and closed positions; a quick opening and closing means for forming a pressure tight seal between said tank body and cover when they are in closed position comprising: a set of uniformly spaced radially outwardly extending locking lugs arranged peripherally about said cover, a second set of a similar number of uniformly spaced radially outwardly extending locking lugs arranged peripherally about the open end of the tank, the space length between the lugs of said first set differing from that between the lugs of said second set, said sets of lugs being of such size so that the lugs of one set will pass between the lugs of the other set when the tank and cover are moved toward open and closed positions, the lugs of at least one of said sets being affixed to the ends of projections which pass through and beyond the lugs of the other set, and an annular locking ring surrounding said tank and cover and positioned between said sets of lugs, said locking ring having uniformly spaced radially inwardly extending locking lugs equal in number to the spaces between one set of lugs through which the other set of lugs passes, each locking lug on said ring having a peripheral length slightly greater than the smaller of said space lengths, said ring being rotatable about the axis of the tank from a position with its lugs spanning and overlapping said spaces to prevent passage of one set of lugs through the spaces of the other set of lugs to a position in which its projecting lugs are clear of such spaces, thereby permitting passage of one set of lugs through the spaces between the other set of lugs.

2. The assembly of claim 1 in which said pressure tight seal is formed by an O ring gasket which is under pressure when the tank body and cover are in closed position.

References Cited in the file of this patent

UNITED STATES PATENTS

| 1,371,912 | Leech | Mar. 15, 1921 |
| 2,225,448 | Hamilton | Dec. 17, 1940 |
| 2,439,161 | DuBois | Apr. 6, 1948 |
| 2,553,220 | Troeger | May 15, 1951 |
| 2,601,936 | Harris | July 1, 1952 |
| 2,684,779 | Rafferty | July 27, 1954 |

FOREIGN PATENTS

| 412,700 | Great Britain | July 5, 1934 |
| 565,307 | Great Britain | Nov. 6, 1944 |
| 1,036,523 | France | Sept. 8, 1953 |